United States Patent
Pantelidou et al.

(10) Patent No.: US 12,452,718 B2
(45) Date of Patent: Oct. 21, 2025

(54) MACHINE LEARNING ASSISTED OPERATIONS CONTROL

(71) Applicant: NOKIA TECHNOLOGIES OY, Espoo (FI)

(72) Inventors: Anna Pantelidou, Massy (FR); Malgorzata Tomala, Wroclaw (PL); Cinzia Sartori, Pullach (DE)

(73) Assignee: Nokia Technologies Oy, Espoo (FI)

( * ) Notice: Subject to any disclaimer, the term of this patent is extended or adjusted under 35 U.S.C. 154(b) by 471 days.

(21) Appl. No.: 17/997,099

(22) PCT Filed: Apr. 28, 2020

(86) PCT No.: PCT/EP2020/061734
§ 371 (c)(1),
(2) Date: Oct. 25, 2022

(87) PCT Pub. No.: WO2021/219201
PCT Pub. Date: Nov. 4, 2021

(65) Prior Publication Data
US 2023/0209384 A1   Jun. 29, 2023

(51) Int. Cl.
*H04W 24/10* (2009.01)
*H04L 41/16* (2022.01)

(52) U.S. Cl.
CPC ............. *H04W 24/10* (2013.01); *H04L 41/16* (2013.01)

(58) Field of Classification Search
CPC ........ H04W 24/02; H04W 24/10; H04L 41/16
See application file for complete search history.

(56) References Cited

U.S. PATENT DOCUMENTS 10,039,016 B1 * 7/2018 Larish .................. H04W 24/02
2019/0220703 A1 * 7/2019 Prakash ................. G06V 10/95
(Continued)

FOREIGN PATENT DOCUMENTS

CN     107809766 A    3/2018
CN     109845310 A    6/2019
(Continued)

OTHER PUBLICATIONS

"3rd Generation Partnership Project; Technical Specification Group Radio Access Network; NR; Radio Resource Control (RRC) protocol specification (Release 15)", 3GPP TS 38.331, V15.8.0, Dec. 2019, pp. 1-532.
(Continued)

*Primary Examiner* — Charles C Jiang
*Assistant Examiner* — Ryan C Kavleski
(74) *Attorney, Agent, or Firm* — Lippes Mathias LLP

(57) ABSTRACT

As an aspect, there is provided an apparatus, caused at least to: receive, by a user device from an access node, a measurement configuration for training of a machine learning operations control model, the measurement configuration comprising an indication of at least one parameter to be measured and at least one acceptance condition for measurement values; obtain at least one measurement value; compare the at least one measurement value to the at least one acceptance condition for defining usability of the at least one measurement value for the training, and when the at least one measurement value is usable for the training, carry out the training of the operations control model, and when the at least one measurement value is not usable for the training, transmit the at least one measurement value to the access node.

19 Claims, 2 Drawing Sheets

(56) References Cited

U.S. PATENT DOCUMENTS

Figure 1:
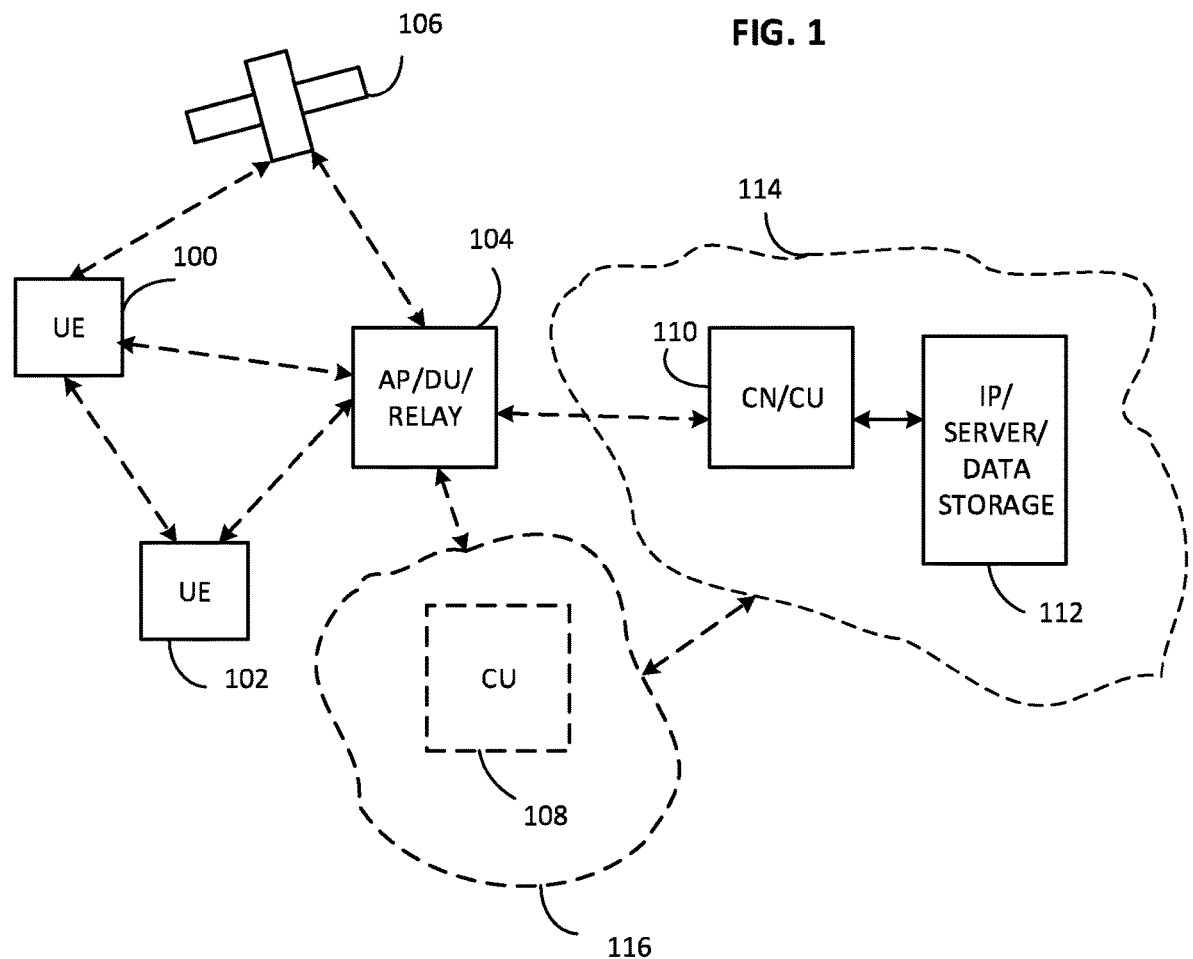

| | | |
|---|---|---|
| 2019/0379470 A1 | 12/2019 | Gervais |
| 2020/0413316 A1 | 12/2020 | Isaksson et al. |
| 2021/0182661 A1* | 6/2021 | Li .......................... H04L 41/16 |
| 2021/0345134 A1* | 11/2021 | Ottersten .............. H04W 16/22 |

FOREIGN PATENT DOCUMENTS

| | | |
|---|---|---|
| EP | 3457634 A1 | 3/2019 |
| WO | 2019/011441 A1 | 1/2019 |
| WO | 2019/172813 A1 | 9/2019 |
| WO | 2020/080989 A1 | 4/2020 |
| WO | 2021/047781 A1 | 3/2021 |
| WO | 2021/048600 A1 | 3/2021 |

OTHER PUBLICATIONS

"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 15)", 3GPP TS 37.320, V15.0.0, Jun. 2018, pp. 1-27.

"New WID on Study on traffic characteristics and performance requirements for AI/ML model transfer in 5GS", 3GPP TSG-SA WG1 Meeting #88, S1-193606, Agenda: 5, OPPO, Nov. 18-22, 2019, 3 pages.

"Revised SID : Study on RAN-centric data collection and utilization for LTE and NR", 3GPP TSG RAN Meeting #81, RP-182105, Agenda: 9.3.13, CMCC, Sep. 10-13, 2018, 6 pages.

Kojola et al., "Distributed Computing of Management Data in a Telecommunications Network", ICST Institute for Computer Sciences, Social Informatics and Telecommunications Engineering , 2017, pp. 146-159.

"3rd Generation Partnership Project; Technical Specification Group Services and System Aspects; Telecommunication management; Subscriber and equipment trace; Trace control and configuration management (Release 16)", 3GPP TS 32.422, V16.0.0, Dec. 2019, pp. 1-197.

"3rd Generation Partnership Project; Technical Specification Group Services and System Aspects; Management and orchestration; Performance assurance (Release 16)", 3GPP TS 28.550, V16.3.0, Dec. 2019, pp. 1-110.

"3rd Generation Partnership Project; Technical Specification Group Services and System Aspects; Management and orchestration; 5G performance measurements (Release 16)", 3GPP TS 28.552, V16. 4.0, Dec. 2019, pp. 1-159.

"3rd Generation Partnership Project; Technical Specification Group Services and System Aspects; Study on non-file-based trace reporting; (Release 16)", 3GPP TR 28.806, V16.1.0, Dec. 2019, pp. 1-28.

"3rd Generation Partnership Project; Technical Specification Group Services and System Aspects; Telecommunication management; Study on the Self-Organizing Networks (SON) for 5G networks (Release 16)", 3GPP TR 28.861, V16.0.0, Dec. 2019, pp. 1-47.

"3rd Generation Partnership Project; Technical Specification Group Services and System Aspects; Telecommunication management; Subscriber and equipment trace; Trace concepts and requirements (Release 16)", 3GPP TS 32.421, V16.0.0, Dec. 2019, pp. 1-49.

"3rd Generation Partnership Project; Technical Specification Group Services and System Aspects; Telecommunication management; Subscriber and equipment trace; Trace data definition and management (Release 15)", 3GPP TS 32.423, V15.1.0, Jun. 2019, pp. 1-94.

"3rd Generation Partnership Project; Technical Specification Group Radio Access Network; NR; Requirements for support of radio resource management (Release 16)", 3GPP TS 38.133, V16.2.0, Dec. 2019, 1129 pages.

Office action received for corresponding European Patent Application No. 20723323.0, dated Mar. 25, 2024, 6 pages.

Notice of Allowance received for corresponding Chinese Patent Application No. 202080100256.3, dated Aug. 1, 2024, 5 pages of Notice of Allowance and no page of translation available.

"Status Quo and way forward for UE RRM policy handling", 3GPP TSG-RAN WG3 #103, R3-190835, Agenda: 25.2.4, Ericsson, Feb. 25-Mar. 1, 2019, 7 pages.

International Search Report and Written Opinion for International Application No. PCT/EP2020/061734, mailed on Dec. 15, 2020, 21 pages.

3GPP TSG-RAN Meeting #86, RP-192603; Agenda Item: 9.1.3; Source: CMCC (Moderator); "Email Discussion on Rel-17 RAN-Centric Data Collection and Utilization Enhancement"; Agenda Item: 9.1.3; Source: CMCC (Moderator); Sitges, Barcelona, Spain; Dec. 9-12, 2019; 36 pages.

3GPP TSG-RAN WG3 #104, R3-193074; "Status Quo and Way Forward for UE RRM Policy Handling"; Agenda Item: 25.2.4; Source: Ericsson; Reno, Nevada, USA; May 13-17, 2019; 7 pages.

3GPP TSG-RAN WG2 Meeting #105, R2-1900226; "Discussion on MDT"; Source: CATT; Agenda Item: 11.12.2; Athens, Greece; Feb. 25-Mar. 1, 2019; 5 pages.

3GPP TSG-RAN WG2 #106, TDoc R2-1906874; "Details of Beam Level Measurements to be Included in MDT"; Agenda Item: 11.12.2; Source: Ericsson, CMCC; Reno, Nevada, USA; May 13-17, 2019; 6 pages.

* cited by examiner

MACHINE LEARNING ASSISTED OPERATIONS CONTROL

CROSS-REFERENCE TO RELATED APPLICATIONS

This application is a national stage entry of International Application No. PCT/EP2020/061734, filed Apr. 28, 2020, entitled "MACHINE LEARNING ASSISTED OPERATIONS CONTROL" which is hereby incorporated by reference in its entirety.

FIELD

The invention relates to communications.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Minimization of Drive Test (MDT) is a standardized 3GPP LTE feature which involves user devices (UEs) in automated collection of measurements and reporting them to the network. This concept aims at replacing dedicated and costly drive testing performed for network optimization. MDT involves (regular) users of a cellular network and utilizes data collected anyway (e.g. for mobility purposes). Two MDT reporting approaches are defined: Immediate MDT reporting and Logged MDT reporting. Immediate MDT reporting means that a user device generates, while it is in connected state, real time report of radio measurements after measurements are carried out. In Logged MDT reporting, the user device is configured for measurements when it is in connected state and the user device collects MDT data when it enters idle or inactive states. The user device in Logged MDT sends reports in a form of logs when it enters connected state.

MDT measurement configuration is further developed for new radio (NR) by introducing more logging conditions for measurement data logging. Immediate MDT configuration uses existing radio resource control (RRC) messages. Immediate MDT additionally allows detailed location information reporting (e.g., Global Navigation Satellite System (GNSS)) in case it is available at the user device.

BRIEF DESCRIPTION

According to an aspect, there is provided an apparatus comprising: at least one processor and at least one memory including a computer program code, the at least one memory and the computer program code configured to, with the at least one processor, cause the apparatus at least to: receive, by a user device from an access node, a measurement configuration for training of a machine learning operations control model, the measurement configuration comprising an indication of at least one parameter to be measured and at least one acceptance condition for measurement values, wherein the machine learning operations control model comprises a machine learning radio resource management model and/or machine learning internal operations model; obtain at least one measurement value; compare the at least one measurement value to the at least one acceptance condition for defining usability of the at least one measurement value for the training, and when the at least one measurement value is usable for the training, carry out the training of the machine learning radio resource management model, and transmit the machine learning radio resource management model as trained to the access node for a radio resource management operation associated with the machine learning radio resource management model, and/or carry out the training of the machine learning operations control model, wherein the machine learning radio resource management model as trained is being used by the user device in the radio resource management operation associated with the machine learning radio resource management model and the machine learning internal operations model is used by the user device in user device operations associated with the internal operations model, or when the at least one measurement value is not usable for the training, transmit the at least one measurement value to the access node.

According to an aspect, there is provided a method comprising: receiving, by a user device from an access node, a measurement configuration, for training of a machine learning operations control radio resource management model, the measurement configuration comprising an indication of at least one parameter to be measured and at least one acceptance condition for measurement values, wherein the machine learning operations control model comprises a machine learning radio resource management model and/or machine learning internal operations model; obtaining at least one measurement value; comparing the at least one measurement value to the at least one acceptance condition for defining usability of the at least one measurement value for the training, and when the at least one measurement value is usable for the training, carrying out the training of the machine learning radio resource management model, and transmitting the machine learning radio resource management model as trained to the access node for a radio resource management operation associated with the machine learning radio resource management model, and/or carrying out the training of the machine learning operations control model, wherein the machine learning radio resource management model as trained is used by the user device in the radio resource management operation associated with the machine learning radio resource management model and the machine learning internal operations model is used by the user device in user device operations associated with the internal operations model, or when the at least one measurement value is not usable for the training, transmitting the at least one measurement value to the access node.

According to an aspect, there is provided an apparatus comprising means for receiving, by a user device from an access node, a measurement configuration, for training of a machine learning operations control radio resource management model, the measurement configuration comprising an indication of at least one parameter to be measured and at least one acceptance condition for measurement values, wherein the machine learning operations control model comprises a machine learning radio resource management model and/or machine learning internal operations model; means for obtaining at least one measurement value; means for comparing the at least one measurement value to the at least one acceptance condition for defining usability of the at least one measurement value for the training, and, when the at least one measurement value is usable for the training, means for carrying out the training of the machine learning radio resource management model, and transmitting the machine learning radio resource management model as trained to the access node for a radio resource management operation associated with the machine learning radio resource management model, and/or means for carrying out the training of the machine learning operations control model, wherein the machine learning radio resource management model as trained is used by the user device in the radio resource management operation associated with the machine learning radio resource management model and the machine learning internal operations model is used by the user device in user device operations associated with the internal operations model, or, when the at least one measurement value is not usable for the training, means for transmitting the at least one measurement value to the access node.

According to an aspect, there is provided a computer program product for a computer, comprising software code portions for receiving, by a user device from an access node, a measurement configuration, for training of a machine learning operations control radio resource management model, the measurement configuration comprising an indication of at least one parameter to be measured and at least one acceptance condition for measurement values, wherein the machine learning operations control model comprises a machine learning radio resource management model and/or machine learning internal operations model; obtaining at least one measurement value; comparing the at least one measurement value to the at least one acceptance condition for defining usability of the at least one measurement value for the training, and when the at least one measurement value is usable for the training, carrying out the training of the machine learning radio resource management model, and transmitting the machine learning radio resource management model as trained to the access node for a radio resource management operation associated with the machine learning radio resource management model, and/or carrying out the training of the machine learning operations control model, wherein the machine learning radio resource management model as trained is used by the user device in the radio resource management operation associated with the machine learning radio resource management model and the machine learning internal operations model is used by the user device in user device operations associated with the internal operations model, or when the at least one measurement value is not usable for the training, transmitting the at least one measurement value to the access node.

LIST OF DRAWINGS

Figure 3:
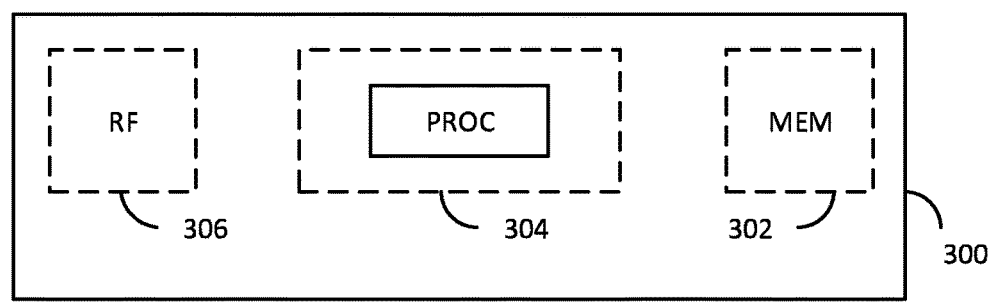
Figure 2:
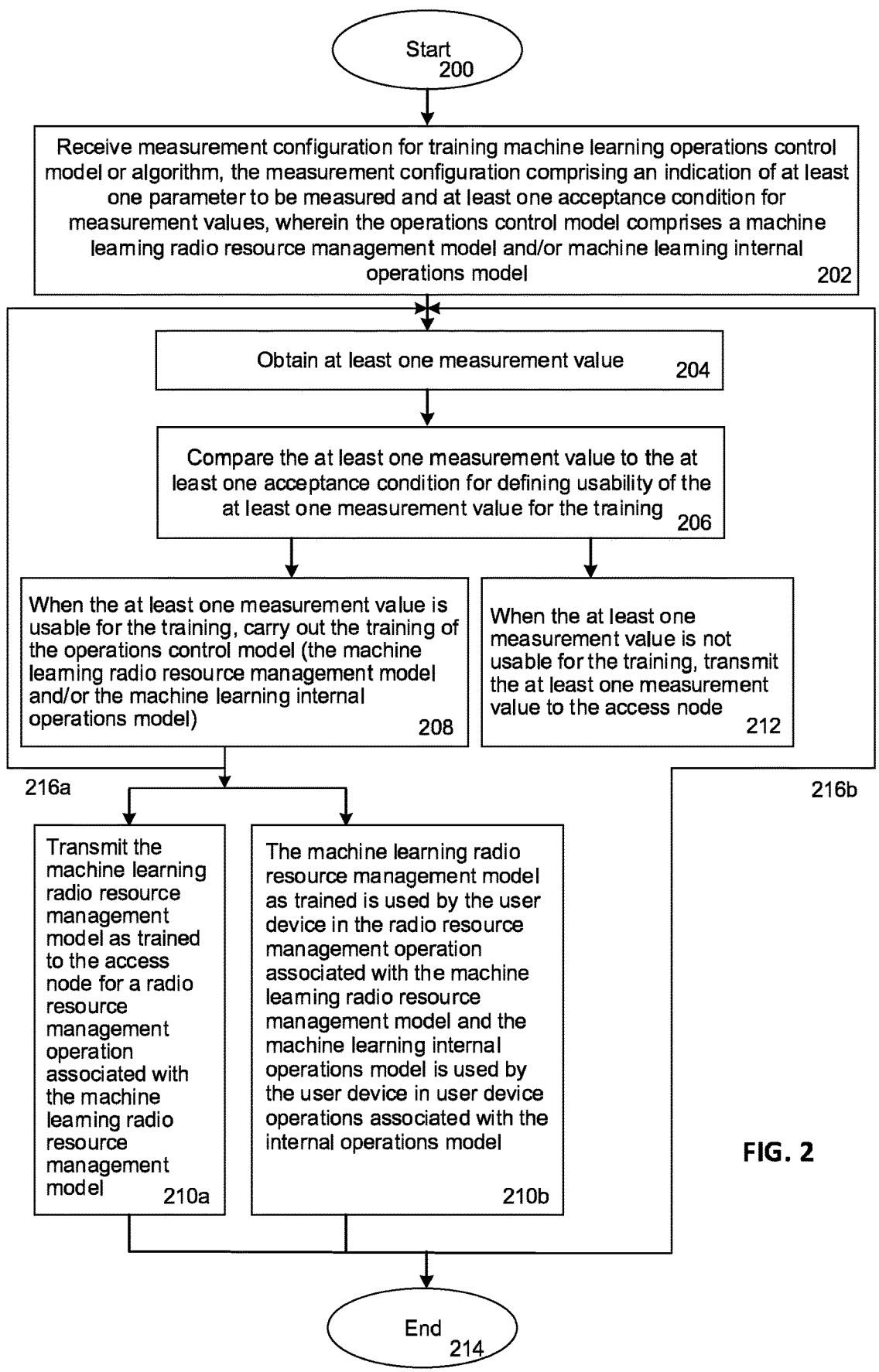

Some embodiments of the present invention are described below, by way of example only, with reference to the accompanying drawings, in which FIG. 1 illustrates an example of a system;
FIG. 2 is a flow chart, and
FIG. 3 illustrates an example of apparatuses.

DESCRIPTION OF SOME EMBODIMENTS

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection with one or more communication channels in a cell with an access node or access point (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc., entities suitable for such a usage, for example according to a higher layer split architecture, comprising a centralized unit (so-called gNB-CU) controlling one or more distributed units (so-called gNB-DU).

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of the communication system it is coupled to. The (e/g)NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, also including a relay node. The network shown in FIG. 1, may support relay operation, both in-band and out-band relaying. In-band relaying may be supported by an integrated access and backhaul (IAB) node and access node (gNB) operations may be carried out by a distributed unit (DU) of the IAB node. The UE operations may be carried out by mobile termination (MT) part of the IAB node. Relaying may be applied to backhauling, e.g., when optical or dedicated wireless backhaul is unavailable or inconvenient. New radio integrated access and backhaul (NR IAB), where some nodes serve both backhaul and radio access, is suitable for this kind of backhauling.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device, or terminal device, may also be a device having capability to operate in an Internet of Things (IoT) network which is a scenario in which objects are provided with the ability to transfer data over a network without requiring human-to-human or human-to-computer interaction. The user device may also utilize the cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum availability. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G supports multiple frequency ranges and it can also be integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G). One of the concepts considered to be used in 5G networks is network slicing in which multiple independent and dedicated virtual sub-networks (network instances) may be created within the same infrastructure to run services that have different requirements on latency, reliability, throughput and mobility.

The low latency applications and services in 5G require to bring the content close to the radio network users, which is enabled by, for example, multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing, also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 104) and non-real time functions being carried out in a centralized manner (in a centralized unit, CU 108, 110). Utilization of cloud or edge cloud is also an option (114, 116).

Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have access to a plurality of radio cells and the system may comprise also other apparatuses, such as physical layer relay nodes or other network elements, etc. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells with a range up to hundreds of meters. The (e/g)NodeBs of FIG. 1 may provide any kind of these cells. A cellular radio system may be implemented as a multilayer network that includes several kinds of cells. Typically, in multilayer networks, one access node provides one kind of a cell or cells, and thus a plurality of (e/g)NodeBs are required to provide such a network structure.

5G evolution drives the need to study use cases and to propose potential service requirements for 5G system support of Artificial Intelligence (AI)/Machine Learning (ML). Machine learning algorithms build a mathematical model based on sample data, known as training data, in order to make predictions or decisions without being explicitly programmed to carry out the task at issue. In general, machine learning relates to optimization. In many practical applications, the task the algorithm performs is formulated as minimization of a loss function on a training set of examples. A loss function expresses the discrepancy between the predictions of the model being trained and the actual observed incidents (for example, in classification, observed incidents, such as measurement values, are assigned a label or a class, and the ML model is trained to correctly predict the labels for future observed incidents). Many different ML algorithms are known, such as supervised learning, unsupervised learning and reinforcement learning. In the following, embodiments are further clarified by means of examples using unsupervised learning, however, the embodiments can be applied by using any ML/AI algorithm and not restricted to the examples shown.

Unsupervised learning algorithms take a set of data, such as measurement data, and seek for a structure in the data, like suitable groups or clusters of data values. Group or cluster analysis is based on assigning observations into subsets in such a manner that the observations within one cluster are similar according to one or more predesignated criteria. Clusters may be defined based on small (Euclidian) distances between cluster members, finding dense areas in the data space, intervals or statistical distributions. The appropriate clustering criteria (such as distance, density threshold or the number of expected clusters) depend on the data set and intended use of the results. One example of principle used in clustering based on proximity search is nearest neighbor search (NNS). Clustering is an iterative process involving trial and error. Clustering algorithms are used, for example, in robotic situational awareness to track objects and detect outliers in sensor data.

Adapting machine learning involves creating a model, which is trained on some training data and used in making predictions after being trained. Various types of models exist, such as artificial neural networks, decision trees, support vector machines and regression analysis. Among neural network models, the self-organizing map (SOM) and adaptive resonance theory (ART) are commonly used regarding unsupervised learning algorithms. The SOM is a topographic organization in which nearby locations in the map represent inputs with similar properties. The ART model allows the number of clusters to vary with problem size and lets the user control the degree of similarity between members of the same clusters by means of a user-defined constant called the vigilance parameter. It should be appreciated that embodiments are applicable to any model.

Minimization of Drive Test (MDT) is a standardized 3GPP LTE feature which involves user devices (UEs) in automated collection of measurements and reporting them to the network. This concept aims at replacing dedicated and costly drive testing performed for network optimization. MDT involves (regular) users of a cellular network and utilizes data collected anyway (e.g. for mobility purposes). Two MDT reporting approaches are defined: Immediate MDT reporting and Logged MDT reporting. Immediate MDT reporting means that a user device generates, while it is in connected state, real time report of radio measurements after measurements are carried out. In Logged MDT reporting, the user device is configured for measurements when it is in connected mode and the user device collects MDT data when it enters idle or inactive states. The user device in Logged MDT sends reports in a form of logs when it enters connected state. The user device may indicate measurement availability to the network through a radio resource control (RRC) message and the network may obtain the logged reports through the UEInformationRequest/Response procedure.

MDT measurement configuration is further developed for new radio (NR), for example, by introducing more conditions to logging area. If a logging area is configured, it can be additionally determined by which neighboring cells a user can log. When a user device performs measurements (and logs them in a report) only when it is inside the logging area, it will also append neighbors only if there were predefined in the condition. Otherwise the user device carries out (and logs) measurements without selection, as if it is allowed to record measurement results recorded from the entire registered public land mobile network (RPLMN) from the configured MDT public land mobile network (PLMN) list.

Training of ML/AI algorithms requires big amounts of data. If training of ML algorithms takes place on the network side, for instance at a (e/g)NodeB, or in case of CU/DU split architectures at a gNB-DU or gNB-CU, a large amount of data will need to be transferred in the network entities where the training takes place. The same applies to training taking place at the Operations, Administration and Maintenance (OAM) of the network or to training taking place at an external entity to the RAN or Core network to which training data can be transferred though the interfaces. Such massive transfer of training data may severely impact network performance as well as spectral efficiency and may create congestion through the interfaces. Thus, a user device taking care of the ML training phase based on measurements it carries out, enables saving radio resources.

One embodiment starts in block 200 of FIG. 2. Embodiment(s) is suitable for being carried out by a user device. Embodiments are applicable for both of area-based (ML measurements are configured to all user devices in a certain area) and signalling-based MDT (ML measurements are configured for a specific user device(s) (e.g., international mobile subscriber identity (IMSI) based user device selection). The embodiment(s) are also suitable for service or network slice—specific operations. As put short, in embodiments, logging interval (in Logged MDT) and report interval (in Immediate MDT) may be seen as being replaced with time-varying intervals of training occasions provided by monitoring functions of measurements. Functions of measurements may create a "non-deterministic" number of training occasions which may not be periodic.

In block 202, a measurement configuration for training of a machine learning operations control model is received from an access node (such as a gNB). The measurement configuration comprises an indication of at least one parameter to be measured and at least one acceptance condition for measurement values. An acceptance condition may be the measured parameter value being in a given range, exceeding a given threshold, etc. The machine learning operations control model comprises a machine learning radio resource management model and/or machine learning internal operations model. In addition, the measurement configuration can comprise a radio resource control (RRC) state for which the configuration is applicable, namely whether it is to be valid for user device in connected, idle, or inactive state or for any combination of the states a user device may be in.

The measurement configuration may otherwise be according to MDT concept, but the information listed above may be added to the MDT concept signaling message(s). The ML algorithm or model to be trained may be stored in the user device in advance or it may be downloaded to the user device for a specific task. It is also an option that there are a plurality of task-specific algorithms or models stored in the user device and the user device selects the one indicated in the measurement configuration. The measurement configuration (e.g. parameter(s) to be measured) may be adapted to the specific task as well. The specific task may be related to a radio resource management operation, such as handover, cell selection or cell reselection, adding a new component carrier, (re-)configuring carrier aggregation, (re-)configuring dual connectivity etc. The specific task may alternatively be related to optimization of some user device's internal functions, such as the utilization of its memory and/or battery resources, choice of antenna(s) in beamforming operations, tuning and correction of the accuracy of positioning system, etc.

A parameter to be measured may be signal quality measurements, such as reference signal received power (RSRP) or reference signal received quality metrics (RSRQ) measurements. An acceptance condition may be a value range, for example over a received signal, or a threshold (or a threshold distance, see the example below) for packet delay, interference level, interference ratio, etc. As to clustering-based ML, there may be an acceptance condition for each cluster. The acceptance condition may comprise a number for detected incidents, such as how many measurement values have to be in the value range. Even though monitoring or measuring is applicable for all radio resource control (RRC) states of user device: idle, inactive and connected, different functions may be applicable for different RRC states and may further depend on the ML model to be trained. In addition, even though monitoring or measuring is applicable for all RRC states of a user device, it is possible that different measurements are available on each RRC state.

The measurement configuration may comprise a target accuracy for training the ML algorithm or model. This may be expressed in the cluster example as a period of time for a cluster head being stable (being the same or near the previous one(s)). The training is seen completed, when the cluster head has been stable for long enough time. The cluster example will be explaining in more detail below in the context of the training of the ML algorithm or model.

The measurement configuration may also comprise a timer for periodically triggering the training. The timer may monitor the time from the end of a previous training period. This is beneficial to give the model an exhausting time improving accuracy in changing environment.

Additionally, the measurement configuration may be area-specific (ML measurements are configured to all user devices in a certain area), user device-specific, user device group—specific (ML measurements are configured for a specific user device(s) (e.g., international mobile subscriber identity (IMSI) based user device selection) and/or service (or network slice) specific. For the service (or network slice) specific operations, latency requirements may be taken into consideration especially in ultra-reliable low latency services, such as with connected vehicles and eHealth.

The training can be specifically triggered, or the training may be carried out as a supplementary activity to normal operation (most suitable for updating an already trained model). The existing logged MDT (for inactive and idle users) or the existing Immediate MDT (for connected users) may be reused to trigger training at a user device along with an indication that configuration should be used for training of an ML model instead of regular logging or reporting respectively. The training could be triggered by OAM (targeted to a set of user devices as in area-based operation) or by a core network (target one or more specific user devices based on IMSI for instance). A new indication (inside the job type or another variable) in the trace activation may be used for that purpose e.g., MDT purpose="ML Training" to indicate triggering of the training of an ML model. For instance, when the existing logged MDT configuration is used for training, the Job Type could be "Logged MDT". If MDT purpose="ML Training", it should be understood that logged MDT Configuration should be used for training of an ML model instead of Logging of measurements. Additionally, there may a variable in the trace activation (inside job type or another variable) to indicate the user device state on which training is performed for instance "ML Training, connected", ML Training, inactive", ML Training, idle" or any combination of the states for state-specific measurement configurations. Yet additionally, there may be an indication showing that the model as trained has to be sent to the access node. This could be the case if the access node is the one where the execution of the ML model will take place. Thus, in the case existing logged MDT configuration is used as adapted to ML training, unlike defining a specific logging time of MDT process, the training period is flexibly adapted to the training time needed for achieving an algorithm or model that is reliable enough for each specific task needed. Additionally, the training period may be applicable during immediate MDT to signal a duration during which the user device is expected to complete the training. Another option is to define a new type of configuration through a new job type value, e.g., "ML training data MDT". In case a new configuration is defined ("ML training data MDT), no logging time or report amount is specified. Instead, there is a training period, that is flexibly adapted to the training time needed for achieving an algorithm or model that is reliable enough for each specific task needed.

The measurement configuration for the training may be received as signaling according to the MDT concept as described above. Signaling the configuration may trigger the training, or a specific triggering signal may be received.

In block 204, at least one measurement value is obtained. The measurement value is obtained according to the measurement configuration and it can be any RRM operation related measurement, such as RSRP or RSRQ, or other type of measurement needed for the task related to the machine learning model (the machine learning radio resource management model and/or the machine learning internal operations model). The measurements may be carried out according to relevant standards. The measurements may be carried out specifically for the training purpose or at least partly in relation to normal network operations. Even though measurements may be carried out in all radio resource control modes or states: idle, inactive and connected, different functions may be applicable for different states and may further depend on the ML model to be trained (for instance based on measurements to be carried out for different radio resources management (RRM) operations as defined by applicable standards). In addition, even though monitoring or measuring is applicable for all RRC states of a user device, it is possible that different measurements are available on each RRC state.

In block 206, the at least one measurement value is compared to the at least one acceptance condition for defining usability of the at least one measurement value for the training. Some examples are checking that the measurement value (measured parameter) is in the indicated value range or exceeds the threshold for packet delay. This enables removing measurement outliers. For instance, if an RSRP measurement is very "far" from a cluster containing measurements that map to similar properties that the ML algorithm will use/optimize it is seen as an outlier. Besides removal of outliers, this further enables training of an ML model based on parameters that satisfy the acceptance condition. For instance, this enables to train the ML model only for users that are in the cell edge and whose RSRP values are less than −100 dBm. Alternatively, this enables to train the ML model only for users that are for example very close to the access node and whose RSRP values are higher than −80 dBm.

In block 208, when the at least one measurement value is usable for the training, the training of the machine learning operations control model (or algorithm) is carried out. The operations control model comprises a machine learning radio resource management model and/or machine learning internal operations model, and which one(s) is trained depends on the usage of the machine learning model as trained as explained above. In the case the model is used for radio resource management related operation, the model trained is the machine learning radio resource management model and when the training is completed, the model as trained is transmitted to the access node for a radio resource management operation associated with the machine learning radio resource management model (210a) and/or the model as trained is used in the radio resource management operation associated with the machine learning radio resource management model by the user device to carry out the radio resource management operation as stand-alone or in cooperation with the access node (210b). The options (transmit the model as trained or not) may be indicated to the user device by the access node, for instance in the trace activation described above. One option is to use a flag to show that the model as trained shall be transmitted to the access node. When the model is used for controlling user device's internal operations (see above), the model trained is the machine learning internal operations model and used by the user device in user device operations associated with the internal operations model (210b).

The following examples relate to the training of an unsupervised learning algorithm. It should be appreciated that the examples are presented for clarification purpose only and should not be found limiting embodiments.

In the example, the ML algorithm is an online K-means unsupervised learning algorithm. The ML algorithm classifies RSRP measurements observed by the user device into K clusters. The initial cluster head of the cluster may be given in the measurement configuration or the user device may choose is randomly or based on measurement history. It may also be the cluster head obtained in a previous time the model was trained. For every new RSRP measurement value, the ML algorithm identifies the cluster the measurement value is added to. Several approaches may be considered. For instance, the measurement value can be placed in the cluster in which the measurement value has a minimum (Euclidian) distance from the cluster head. If the measurement exceeds a threshold distance from the cluster head, it is considered to deviate from the ML model and is not used for the training. The threshold distance may be given in the measurement configuration.

In another example, the measurement value may be placed in the cluster in which the measurement value has a minimum distance from the mean value of all existing measurement values (points) in the cluster. If the measurement exceeds a threshold distance from the mean value of all the points in the cluster, it is considered to deviate from the ML model and is not used for the training. The threshold distance may be given in the measurement configuration.

Yet in another example, the measurement value may be placed in the cluster in which the measurement value has a minimum distance to a boundary point of the cluster. If the measurement exceeds a threshold distance from the boundary point, it is considered to deviate from the ML model and is not used for the training. The boundary point and/or the threshold distance may be given in the measurement configuration.

Yet in another example, a weighted linear combination of the above may be taken and the measurement value may be placed in the cluster in which the measurement satisfies the minimum of the weighted linear combination.

During the training, the cluster head is changed to a new one that minimizes the distance from all members of the (new) cluster (created by adding one or more new measurement values to the model or algorithm) until it convergences (a target accuracy is reached) in which case the ML model is assumed to be trained. The model may be considered converged when the cluster head does not change when a new RSRP measurement is input to the model during a certain period or the new cluster head is near the previous one. This period may be indicated in the measurement configuration together with a threshold value for the acceptable distance to the previous cluster head. It may be adapted for improving the reliability of the model, though, for example to better suit the stability of radio conditions in each radio channel measured.

Another clustering method is mean shift clustering that is a sliding-window-based algorithm attempting to find dense areas of data points. The target of the algorithm is to locate center points of each group or class by updating candidates for center points to be the mean of the points within the sliding-window. At every iteration, the sliding window is moved towards higher density areas by moving the center point to the mean of the points within the window. Other methods exist.

In block 212, when the at least one measurement value is not usable for the training (e.g. it is an outlier), the at least one measurement value is transmitted to the access node. The measurement value may be given a timestamp, the deviation from the ML model in terms of a mean square error or other metric depending on the ML model under training, and/or location information (for example the antenna beam). The measurement values not usable in the training may be used in fault analysis or prediction by the access node.

When the user device is in (radio resource connection) connected state, the transmitting the model or measurement value(s) may take place without delay caused by state transition, for example by using an RRC message towards the access node. Alternatively, configured grant resources or measurement reporting time and frequency resources informed in the measurement configuration could be used for the transmission of the model or measurement values(s). The user device may transmit the machine learning radio resource management model as trained to the access node when requested by the access node or by user device's own initiative. To enable access node to request the machine learning model, the user device can use an RRC message when in RRC connected state, to indicate the end of the training period to the access node which then requests the model when it is needed for carrying out a radio resource management operation or when there is no high priority traffic to schedule, for instance. Subsequently, the access node can send a request for the ML model through a RRC message (e.g. UEInformationRequest) and the user device may include the ML model in a reply RRC (e.g. UEInformationResponse) message.

When the user device is in (RRC) idle or inactive state, the user device transmits the machine learning radio resource management model as trained or the at least one measurement value to the access node after state change to connected state.

The obtaining, the comparing and the carrying out the training or the transmitting the at least one measurement value may be repeated until the training of the machine learning radio resource management model reaches a target accuracy defined by at least one parameter associated to variation among the at least one measurement value. However, a timer may be used to control that the training does not continue for too long in the case the target accuracy is not reached in a reasonable time. This time can be dependent on the training model, on the specific task needed, etc. However, this time may be long, for example hours, provided the normal operation of the user device is not jeopardized. The training may also be interrupted in case the user device is used for higher priority use, such as making a call or downloading or uploading user data or receiving control data, such as a paging request. In case of interruption, the model may be stored, and the training may continue after the high priority use. This enables training during long time, even days, and in variable conditions. The timer may be adapted to user device's activity state or mode, for example it may be longer for inactive or idle state, or inactive or idle state timer may also control the training period, alone or in connection to the training timer. The timer may also be adapted based on history information on success in training.

The obtaining, the comparing and the carrying out the training or the transmitting the at least one measurement value may be triggered periodically in which case the period is indicated in the measurement configuration (see block 202). This periodic triggering enables control of training being carried out often enough for preventing decrease in reliability of the model. The triggering may be based on expiration of a time stamp in which case the time stamp may be given in the measurement configuration. On the other hand, the training may be carried out periodically and the model may be stored to wait for the following period until the training is seen accomplished. The training timer may be adapted to the periodicity and it may count the periods carried out for preventing too long training.

If the training ends without reaching the target accuracy, the user device may, in addition to transmitting the model as trained, inform the access node of the deviation from the target accuracy. The access node may then use the model or wait for a more accurate model depending, for example, on the requirements of the service. Ultra-reliable low-latency communication (URLLC) traffic most probably requires the model being very accurate and packet data delivery can be successfully carried out with a less accurate model, especially with packet duplication. The user device may user the model or wait for a more accurate one as well.

User device may indicate the end of the repeating to the access node that is to say the end of the training of the ML model or algorithm.

The embodiment ends in block 214. The embodiment(s) is(are) repeatable in many ways. Some examples are shown by arrow 216a (repeating the obtaining at least one measurement value in block 204, the comparing in block 206 and the training in block 208) and by arrow 216b (repeating the obtaining at least one measurement value in block 204, the comparing in block 206 and the transmitting in block 212 (the transmitting may be take place immediately after block 206 or the values may be stored and reported later, for example when the user device is in inactive or idle state or a logged MDT operation is configured as explained above)). It should be understood, that the embodiment(s) may be repeated one or more times with a constant or variable pause between separate rounds.

The techniques described herein may be implemented by various means. For example, these techniques may be implemented in hardware (one or more devices), firmware (one or more devices), software (one or more modules), or combinations thereof.

FIG. 3 illustrates a simplified block diagram of an apparatus according to an embodiment in relation to FIG. 2.

An embodiment provides an apparatus which may be a user device or any other suitable apparatus capable to carry out processes described above in relation to FIG. 2.

It should be appreciated that the apparatus may include or otherwise be in communication with a control unit, one or more processors or other entities capable of carrying out operations according to the embodiments described by means of FIG. 2. It should be understood, that each block of the flowchart of FIG. 2 and any combination thereof may be implemented by various means or their combinations, such as hardware, software, firmware, one or more processors and/or (electronic) circuitry.

Terms "receive", "transmit" and "broadcast" may comprise reception or transmission via a radio path. These terms may also mean preparation of a message to the radio path for an actual transmission or processing a message received from the radio path, for example, or controlling or causing a transmission or reception, when embodiments are implemented by software.

As an example of an apparatus according to an embodiment, it is shown apparatus 300, such as a user device, including facilities in control unit or circuit/circuitry 304 (including one or more processors, for example) to carry out functions of embodiments according to FIG. 2. The facilities may be software, hardware or combinations thereof as described in further detail below.

In FIG. 3, block 306 includes parts/units/modules needed for reception and transmission, usually called a radio front end, RF-parts, radio parts, remote radio head, etc. The parts/units/modules needed for reception and transmission may be comprised in the apparatus or they may be located outside the apparatus the apparatus being operationally coupled to them. The apparatus may also include or be coupled to one or more internal or external memory units.

Another example of apparatus 300 may include at least one processor 304 and at least one memory 302 including a computer program code, the at least one memory and the computer program code configured to, with the at least one processor, cause the apparatus at least to: receive, by a user device from an access node, a measurement configuration for training of a machine learning operations control model, the measurement configuration comprising an indication of at least one parameter to be measured and at least one acceptance condition for measurement values, wherein the machine learning operations control model comprises a machine learning radio resource management model and/or machine learning internal operations model; obtain at least one measurement value; compare the at least one measurement value to the at least one acceptance condition for defining usability of the at least one measurement value for the training, and when the at least one measurement value is usable for the training, carry out the training of the machine learning radio resource management model, and transmit the machine learning radio resource management model as trained to the access node for a radio resource management operation associated with the machine learning radio resource management model, and/or carry out the training of the machine learning operations control model, wherein the machine learning radio resource management model as trained is being used by the user device in the radio resource management operation associated with the machine learning radio resource management model and the machine learning internal operations model is used by the user device in user device operations associated with the internal operations model, or when the at least one measurement value is not usable for the training, transmit the at least one measurement value to the access node.

It should be understood, that the apparatus may include or be coupled to other units or modules etc., such as radio parts or radio heads, used in or for transmission and/or reception. This is depicted in FIG. 3 as optional block 306.

Yet another example of an apparatus comprises means (304, (306)) for receiving, by a user device from an access node, a measurement configuration for training of a machine learning operations control model, the measurement configuration comprising an indication of at least one parameter to be measured and at least one acceptance condition for measurement values, wherein the machine learning operations control model comprises a machine learning radio resource management model and/or machine learning internal operations model; means (304, (306)) for obtaining at least one measurement value; means (302, 304) for comparing the at least one measurement value to the at least one acceptance condition for defining usability of the at least one measurement value for the training, and, when the at least one measurement value is usable for the training, means (302, 304) for carrying out the training of the machine learning radio resource management model, and means (302, 304, (306)) for transmitting the machine learning radio resource management model as trained to the access node for a radio resource management operation associated with the machine learning radio resource management model, and/or means (302, 304) for carrying out the training of the machine learning operations control model, wherein the machine learning radio resource management model as trained is used by the user device in the radio resource management operation associated with the machine learning radio resource management model and the machine learning internal operations model is used by the user device in user device operations associated with the internal operations model, or, when the at least one measurement value is not usable for the training, means (304, (306)) for transmitting the at least one measurement value to the access node.

It should be understood, that the apparatus may include or be coupled to other units or modules. Radio parts or radio heads, used in or for transmission and/or reception, may be a part of the apparatus or a module the apparatus is operationally coupled to. This is depicted in FIG. 3 as optional block 306. The apparatus may also include or be coupled to a communications or user interface.

Although the apparatuses have been depicted as one entity in FIG. 3, different modules and memory may be implemented in one or more physical or logical entities.

An apparatus may in general include at least one processor, controller, unit, module or (electronic) circuitry designed for carrying out functions of embodiments operationally coupled to at least one memory unit (or service) and to typically various interfaces. A circuitry may refer to hardware-only circuit implementations, such as implementations in only analog and/or digital circuitry, combinations of circuits and software (and/or firmware), such as different kind of processors of portions of them, software and/or circuit components, such as a microprocessor(s) or a portion of a microprocessor(s). Further, the memory units may include volatile and/or non-volatile memory. The memory unit may store computer program code and/or operating systems, information, data, content or the like for the processor to perform operations according to embodiments described above in relation to FIG. 2. Each of the memory units may be a random-access memory (RAM), dynamic RAM, static RAM (SRAM), a flash memory, a solid-state disk (SSD), PROM (programmable read-only memory), a suitable semiconductor, or any other means of implementing an electrical computer memory. The memory units may be at least partly removable and/or detachably operationally coupled to the apparatus. The memory may be of any type suitable for the current technical environment and it may be implemented using any suitable data storage technology, such as semiconductor-based technology, flash memory, magnetic and/or optical memory devices. The memory may be fixed or removable.

The apparatus may be an (electronic) circuit or a system of (electronic) circuits performing a particular function in an electronic device with a computer program code. The (electronic) circuit may comprise at least one processor and additionally at least one internal or external memory.

As used in this application, the term 'circuitry' (or circuit) refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The apparatus may include or be associated with at least one software application, module, unit or entity configured as arithmetic operation, or as a program (including an added or updated software routine), executed by at least one operation processor. Programs, also called program products or computer programs, including software routines, applets and macros, may be stored in any apparatus-readable data storage medium and they include program instructions to perform particular tasks. The data storage medium may be a non-transitory medium. The computer program or computer program product may also be downloaded to the apparatus. A computer program product may comprise one or more computer-executable components which, when the program is run, for example by one or more processors possibly also utilizing an internal or external memory, are configured to carry out any of the embodiments or combinations thereof described above by means of FIG. 2. The one or more computer-executable components may be at least one software code or portions thereof. Computer programs may be coded by a (high level) programming language or a low-level programming language.

Embodiments provide computer programs embodied on a distribution medium, comprising program instructions which, when loaded into electronic apparatuses, constitute the apparatuses as explained above or cause the apparatuses to carry out embodiments described above in relation to FIG. 2. The distribution medium may comprise, for example: any entity or device capable of carrying the computer program code to the one or more processors, a record medium, a computer memory, a read-only memory, an electrical carrier signal, a telecommunications signal, and a software distribution medium. In some jurisdictions, depending on the legislation and the patent practice, the computer-readable medium or a distribution medium may not be the telecommunications signal. In an embodiment, the computer-readable medium or a distribution medium may be a computer-readable storage medium. In an embodiment, the computer-readable medium or the distribution medium may be a non-transitory computer-readable storage medium.

Embodiments provide computer programs comprising instructions which, when the program is executed by an apparatus, cause the apparatus to carry out embodiments described by means of FIG. 2.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

There are many ways to structure the computer program code: the operations may be divided into modules, subroutines, methods, classes, objects, applets, macros, etc., depending on the software design methodology and the programming language used. In modern programming environments, there are software libraries, i.e. compilations of ready-made functions, which may be utilized by the computer program code for performing a wide variety of standard operations. In addition, an operating system (such as a general-purpose operating system) may provide the computer program code with system services.

Modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a node device, or a corresponding component, may be configured as a computer or a microprocessor, such as single-chip computer element, or as a chipset, including at least a memory for providing storage capacity used for arithmetic operation and an operation processor for executing the arithmetic operation.

A non-exhaustive list of implementation techniques for the processor and the memory includes, but is not limited to: logic components, standard integrated circuits, application-specific integrated circuits (ASIC), system-on-a-chip (SoC), application-specific standard products (ASSP), microprocessors, microcontrollers, digital signal processors, special-purpose computer chips, field-programmable gate arrays (FPGA), and other suitable electronics structures.

For firmware or software, the implementation may be carried out through modules of at least one chip set (e.g., procedures, functions, and so on) that perform the functions described herein. The software codes may be stored in a memory unit and executed by processors. The memory unit may be implemented within the processor or externally to the processor. In the latter case it may be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims.

The invention claimed is:

1. An apparatus comprising:
at least one processor and at least one memory including a computer program code, the at least one memory and the computer program code configured to, with the at least one processor, cause the apparatus at least to:
receive, by a user device from an access node, a measurement configuration for training of a machine learning operations control model, the measurement configuration comprising an indication of at least one parameter to be measured and at least one acceptance condition for measurement values of the at least one measured parameter, wherein the machine learning operations control model comprises a machine learning radio resource management model and machine learning internal operations model;
obtain at least one measurement value;
compare the at least one measurement value to the at least one acceptance condition for defining usability of the at least one measurement value for the training, and when the at least one measurement value is usable for the training,
carry out the training of the machine learning radio resource management model, and transmit the machine learning radio resource management model as trained to the access node for a radio resource management operation associated with the machine learning radio resource management model, and
carry out the training of the machine learning operations control model, wherein the machine learning radio resource management model as trained is used by the user device in the radio resource management operation associated with the machine learning radio resource management model and the machine learning internal operations model is used by the user device in user device operations associated with the internal operations model, and
when the at least one measurement value is not usable for the training,
transmit the at least one measurement value to the access node,
wherein the measurement configuration is area-specific, user device-specific, user device group-specific and service-specific.

2. The apparatus of claim 1, wherein the obtaining, the comparing and the carrying out the training or the transmitting the at least one measurement value are repeated until the training of the operations control model reaches a target accuracy defined by at least one parameter associated to variation among the at least one measurement value.

3. The apparatus according to claim 1, wherein the obtaining, the comparing and the carrying out the training or the transmitting the at least one measurement value are repeated until the training of the operations control model reaches a target accuracy defined by at least one parameter associated to variation among the at least one measurement value, further comprising causing the apparatus to indicate end of the repeating to the access node.

4. The apparatus according to claim 1, wherein the obtaining, the comparing and the carrying out the training or the transmitting the at least one measurement value are triggered periodically and wherein the period is indicated in the measurement configuration.

5. The apparatus of claim 1, wherein the measurement configuration comprises a radio resource control (RRC) state for which the configuration is to be valid for user device in connected, idle, or inactive state or for any combination of the states a user device may be in.

6. The apparatus of claim 1, wherein when the user device is in connected state, the user device transmits the machine learning radio resource management model as trained to the access node when requested by the access node or by user device's own initiative.

7. The apparatus of claim 1, wherein when the user device is in idle or inactive state, the user device transmits the machine learning radio resource management model as trained or the at least one measurement value to the access node after state change to connected state.

8. A method comprising:
receiving, by a user device from an access node, a measurement configuration, for training of a machine learning operations control model, the measurement configuration comprising an indication of at least one parameter to be measured and at least one acceptance condition for measurement values of the at least one measured parameter, wherein the machine learning operations control model comprises a machine learning radio resource management model and machine learning internal operations model;
obtaining at least one measurement value;
comparing the at least one measurement value to the at least one acceptance condition for defining usability of the at least one measurement value for the training, and when the at least one measurement value is usable for the training, carrying out the training of the machine learning radio resource management model, and transmitting the machine learning radio resource management model as trained to the access node for a radio resource management operation associated with the machine learning radio resource management model, and
carrying out the training of the machine learning operations control model, wherein the machine learning radio resource management model as trained is used by the user device in the radio resource management operation associated with the machine learning radio resource management model and the machine learning internal operations model is used by the user device in user device operations associated with the internal operations model, or
when the at least one measurement value is not usable for the training,
transmitting the at least one measurement value to the access node,
wherein the measurement configuration is area-specific, user device-specific, user device group-specific and service-specific.

9. The method of claim 8, wherein the obtaining, the comparing and the carrying out the training or the transmitting the at least one measurement value are repeated until the training of the operations model reaches a target accuracy defined by at least one parameter associated to variation among the at least one measurement value.

10. The method of claim 8, wherein the obtaining, the comparing and the carrying out the training or the transmitting the at least one measurement value are repeated until the training of the operations control model reaches a target accuracy defined by at least one parameter associated to variation among the at least one measurement value, further comprising indicating end of the repeating to the access node.

11. The method according to claim 8, wherein the obtaining, the comparing and the carrying out the training or the transmitting the at least one measurement value are triggered periodically and wherein the period is indicated in the measurement configuration.

12. The method according to claim 8, wherein there are a plurality of task-specific algorithms or models stored in the user device and the user device selects the one indicated in the measurement configuration, wherein the measurement configuration is adapted to a specific task, wherein the specific task is related to a radio resource management operation, wherein the radio resource management operation comprises at least one of handover, cell selection or cell reselection, adding a new component carrier, configuring or reconfiguring carrier aggregation, configuring or reconfiguring dual connectivity.

13. The method according to claim 8, wherein there are a plurality of task-specific algorithms or models stored in the user device and the user device selects the one indicated in the measurement configuration, wherein the measurement configuration is adapted to a specific task, wherein the specific task is related to optimization of the user device's internal functions, wherein the internal functions comprise the utilization of its memory, battery resources, choice of antenna in beamforming operations, tuning and correction of the accuracy of positioning system and wherein when the user device is in connected state, the user device transmits the machine learning radio resource management model as trained to the access node when requested by the access node or by user device's own initiative.

14. The method according to claim 8, wherein the measurement configuration comprises a timer for periodically triggering the training, wherein the timer monitors time from the end of a previous training period and wherein when the user device is in idle or inactive state, the user device transmits the machine learning radio resource management model as trained or the at least one measurement value to the access node after state change to connected state.

15. The method according to claim 8, wherein the at least one measurement value is placed in a cluster in which the measurement value has a minimum distance from the mean value of all existing measurement values in the cluster, and when a measurement exceeds a threshold distance from the mean value of all the points in the cluster, it is considered to deviate from the machine learning model and is not used for the training, wherein the threshold distance is given in the measurement configuration.

16. The method according to claim 8, wherein the at least one measurement value is placed in a cluster in which the measurement value has a minimum distance to a boundary point of the cluster, and when the measurement exceeds a threshold distance from the boundary point, it is considered to deviate from the machine learning model and is not used for the training, wherein the boundary point and the threshold distance are given in the measurement configuration.

17. The method according to claim 16, wherein during the training, a cluster head is changed to a new one that minimizes the distance from all members of a new cluster created by adding one or more new measurement values to the model or algorithm until a target accuracy is reached, wherein the model is considered converged when the cluster head does not change when a new RSRP measurement is input to the model during a certain period or the new cluster head is near the previous one, wherein this period is indicated in the measurement configuration together with a threshold value for the acceptable distance to the previous cluster head.

18. The method according to claim 8, wherein the measurement value is given a time stamp, the deviation from the machine learning model in terms of a mean square error, and location information.

19. The method according to claim 18, wherein the obtaining, the comparing and the carrying out the training or the transmitting the at least one measurement value is triggered periodically, wherein the period is indicated in the measurement configuration, wherein the triggering is based on expiration of the time stamp is given in the measurement configuration.

* * * * *